Figure 1:
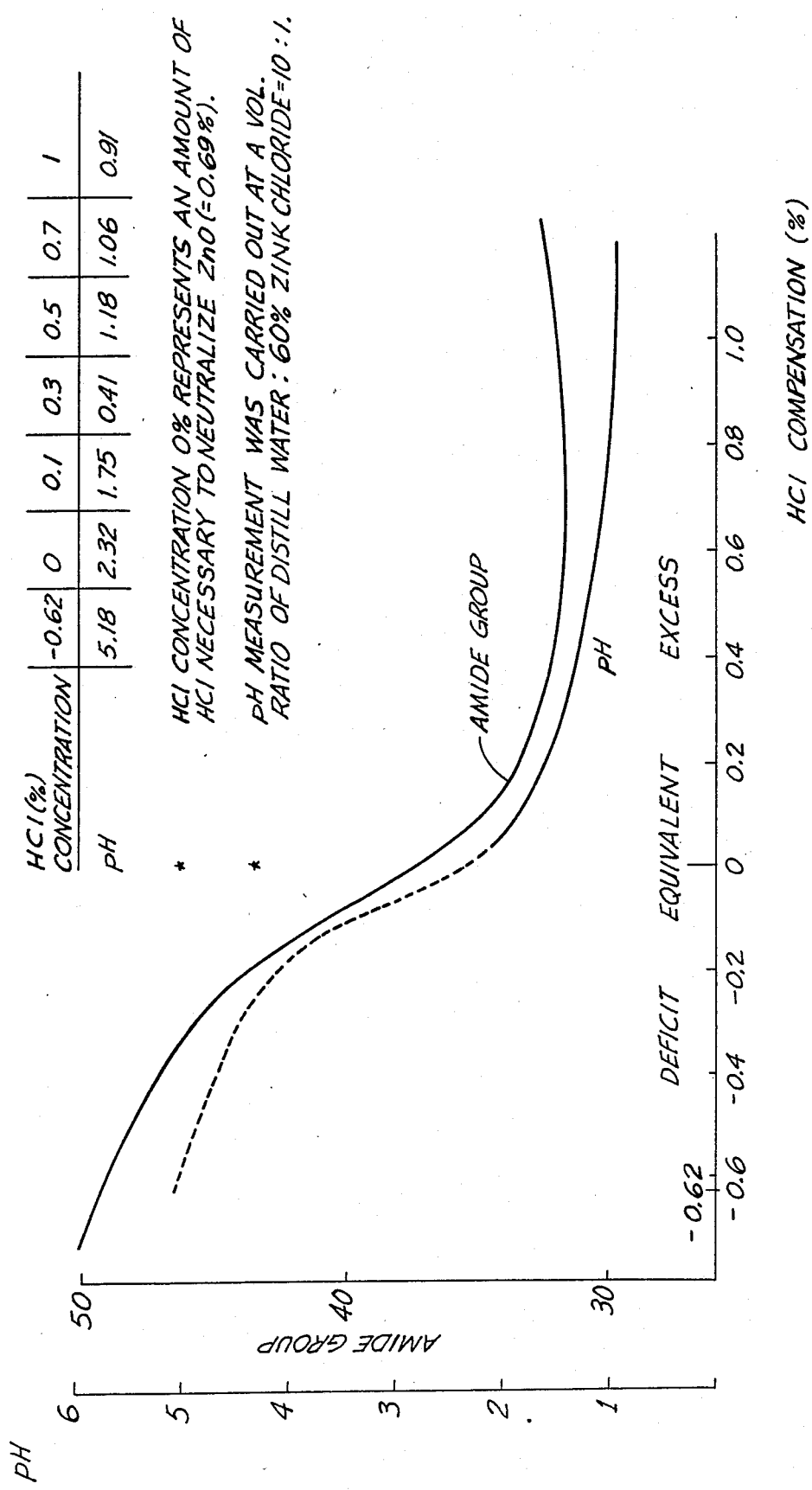

United States Patent [19]

Imai et al.

[11] Patent Number: 4,902,762
[45] Date of Patent: Feb. 20, 1990

[54] PROCESS FOR PREPARING CARBON FIBERS OF HIGH STRENGTH

[75] Inventors: Koichi Imai; Misao Sumoto; Hiroyuki Nakamura; Namasa Miyahara, all of Tokyo, Japan

[73] Assignee: Nikkiso Co., Ltd., Tokyo, Japan

[21] Appl. No.: 12,014

[22] Filed: Feb. 9, 1987

Related U.S. Application Data

[63] Continuation-in-part of Ser. No. 693,723, Jan. 23, 1985, abandoned.

[30] Foreign Application Priority Data

Feb. 10, 1984 [JP] Japan .................................. 59-21995

[51] Int. Cl.⁴ .......................... C08F 4/00; C08F 20/44; C08F 120/44
[52] U.S. Cl. .................................... 526/237; 526/238; 526/341; 526/342; 528/481

[58] Field of Search ............... 526/237, 341, 342, 238; 528/481

[56] References Cited

U.S. PATENT DOCUMENTS 2,952,651  9/1960  Armen et al. ..................... 526/237
3,479,312  11/1969  Grajii et al. ........................ 526/237
3,632,798  1/1972  Morita et al. ...................... 528/481

Primary Examiner—Joseph L. Schofer
Assistant Examiner—Peter F. Kulkosky
Attorney, Agent, or Firm—Helfgott & Karas

[57] ABSTRACT

A process for preparing carbon fibers of high strength which includes the steps of homopolymerizing acrylonitrile or copolymerizing acrylonitrile with other vinyl monomers in a concentrated zinc chloride aqeuous solution containing 0.01-5% by weight of hydrogen chloride to form a polymeric solution which is spinned to form precursor filaments which are carbonized to provide carbon fibers.

8 Claims, 2 Drawing Sheets

PROCESS FOR PREPARING CARBON FIBERS OF HIGH STRENGTH

REFERENCE TO PRIOR APPLICATION

The present application is a continuation-in-part of our U.S. application 693,723 filed Jan. 23, 1985 now abandoned.

FIELD OF THE INVENTION

This invention relates to a process for preparing acrylonitrile-based filaments for carbon fibers free of agglutination, especially in which an acrylonitrile-based polymer is obtained from a medium containing a concentrated zinc chloride aqueous solution and hydrogen chloride, and in which filaments resulting therefrom are subjected to a stabilization step (or flame-proofing treatment) to form carbon fibers free of agglutination but having very high strength.

In the following description, the term "agglutination" signifies that the filaments formed are coalesced to one another and in extreme cases all filaments in a tow or bundle are completely coalesced. For example, in U.S. Pat. No. 4,603,042 a term of "self-adhesion" or "fusion bonding" is used for signifying the same phenomenon as the agglutination in this invention. If the agglutination is severe, bending of the tow for forming a loop results in edged or square looping of the tow and even when agglutination is slight and the tow is readily bendable, some of the filaments are nevertheless partially coalesced with one another, preventing complete separation therebetween. Agglutination generally occurs during a spinning procedure or may be caused by hot roller surfaces, but mainly occurs during the stabilization of the filaments.

BACKGROUND OF THE INVENTION

Heretofore, as continuous carbon fibers of high strength there have been practically obtained only acrylonitrile-based filaments. Carbon fibers of high strength or graphite fibers of high elastic modulus have been increasingly utilized as a reinforcement material for light weight plastics in order to provide moulding of higher strength and elastic modulus than metals, and also employed for reinforcing the metals.

There has now been demand for carbon fibers having much higher strength in order to improve the quality of reinforced carbon fiber products and to decrease content of the carbon fibers for cost reduction.

In general, a process for preparing carbon fibers from acrylonitrile-based filaments comprises a stabilization step (or flame-proofing treatment) involving heating the filaments at 200°–300° C. in air and a carbonization step involving heating the stabilized filaments at 800°–1500° C. in a non-oxidative atmosphere to form the carbon fibers. It has been known that cyclization and oxidation of molecules may occur in the filaments during the stabilization step, that these reactions are exothermic and that such step may cause agglutination between the filaments in a bundle, depending on the stabilization conditions, thereby decreasing the strength of the carbon fibers. Such decrease probably results from the fact that the agglutination of the filaments prevents the heat of reaction from being dissipated, thereby excessively raising the temperature within the filaments or the bundle. Accordingly, it is one of the objectives of this invention to prevent agglutination in order that carbon fibers of high strength be obtained. Attempts have been made to eliminate the agglutination problem by, for example, rubbing the filaments with an edge or crumpling the filament during the stabilization step. Once agglutination start, however, it cannot completely be eliminated. Hence, as noted, it is important to prevent agglutination of fibers per se or bundles thereof. Agglutination prevention methods have involved known physical and chemical treating methods. Physical treatments have generally involved bending acrylonitrile-based filament bundles under tension (Japanese Opened Patent Application 32735/78) and treating acrylonitrile-based filament bundles under tension in a hot water bath of 30°–100° C. (Japanese Patent Publication 50009/81). As a chemical method it is known to treat acrylonitrile-based filament bundles in a stabilizing or carbonizing furnace after depositing long chain silicone oil on the filament bundles. However, the strength of the carbon fibers obtained by these physical and chemical methods or a combination thereof has been limited to the order of 350 kg/mm$^2$.

Another objective of the invention is to prepare carbon fibers of very high strength, that is, greater than 400 Kg/mm$^2$, preferably greater than 500 kg/mm$^2$, in a commercially convenient and efficient manner to form acrylonitrile-based filaments obtained by homopolymerizing acrylonitrile or copolymerizing acrylonitrile with other vinyl monomers in a solvent of a concentrated zinc chloride aqueous solution to form a polymeric solution that is subjected to a spinning step. The concentrated zinc chloride aqueous solution is a good solvent for the acrylonitrile polymes, in which acrylonitrile may be readily polymerized to form polymers having less branched chains due to a low chain-transfer constant of acrylonitrile. Thus, even a high concentration of the solution may be superior in spinnability for polymers of high polymerization degree. Depending on the conditions, it is possible to obtain a rate of drawing the filaments from the coagulating bath three times higher than a linear velocity in a nozzle opening (namely, a nozzle draft is larger than 3). When the nozzle draft is high, filaments of small diameter may be formed with less orientation of polymer molecules within the filament (thus without increase of filament breakage) which is desirable for decreasing the difference of the stabilization degrees between a surface layer and a core of each filament in the stabilization step. In such case, however, a problem with agglutination may occur during the stabilization step, giving rise to carbon fibers of very poor strength. During investigation, with extensively conducted experiments, it has now been found out that addition of hydrogen chloride to an aqueous zinc chloride solution before polymerization may reduce agglutination of the stabilized filaments (especially during the stabilization step) and that the addition of HCl in an excess amount over an equivalent point for neutralizing basic salts contained as impurities in commercially available zinc chloride should be required in order to avoid the agglutination completely. We have determined that the concentration of hydrogen chloride in the zinc chloride aqueous solution should be such that the pH of the solution does not exceed 2 if consistently high strength fibers are to be obtained; e.g. greater than 400 to 500 kg/mm$^2$. In the following description, all the pH value is determined for a solution prepared by combining one part of the aqueous zinc chloride solution with ten parts of distilled water. Without the dilution, the aqueous zinc chloride solution as such cannot display a pH value, or may be scaled out in negative side.

The reason why the stated pH and the defined low content of hydrogen chloride has a significant effect on preventing agglutination and producing carbon fibers of high strength is not clear. Without being held to any theory, we believe that the presence of a critical amount of hydrogen chloride in the zinc chloride aqueous solution (where the pH of the solution is at most 2) significantly decreases the amide group in the filament, compared to use of hydrogen chloride in an amount just necessary to neutralize basic salts in the zinc chloride aqueous solution, as evidenced by an infrared absorption spectrum at 1685 cm$^{-1}$ for the amide group, as more fully explained hereinafter with respect to FIGS. 1 and 2 of the accompanying drawing. The low amide content is considered to have relation with basic salts in the zinc chloride aqueous solution. The presence of the critical amount of hydrogen chloride is believed to shift an equilibrium toward decrease of the basic salts with prevention of hydrolysis of a nitrile group. A stoichiometric amount of hydrogen chloride equivalent to that of the basic salts has been found not to prevent agglutination and hence more than an equivalent amount of hydrogen chloride is required. In view of previous reports that nitrile groups were deliberately hydrolyzed to form amide groups to obtain carbon fibers of high strength, the fact that significantly reduced amide groups result in carbon fibers of extremely high strength is a surprising and unexpected finding of the invention.

U.S. Pat. No. 2952651 to Armen is concerned with a process for modifying polyacrylonitrile of the fiber-forming varirty so as to enhance its dye receptivity. In Armen a zinc chloride solution of polyacrylonitrile has added thereto an alcohol which upon heating converts nitrile groups to amide groups to improve dye receptivity. In Armen a fortuitous reference to hydrochloric acid is made (see column 3 lines 46 to 48) and is used to adjust his zinc chloride aqueous solution to PH3 presumably to enhance the conversion of nitrile groups to amide groups which is the antithesis of applicant's objective to reduce amide groups to prevent agglutination and to ensure carbon fibers of a strength greater than 400 to 500 kg/mm$^2$. In table 1 hereinafter discussed, it will be seen that for an aqueous zinc chloride solution containing HCL in a concentration to adjust the PH of the solution to PH3 agglutination of fibers occur and fibers of reduced strength result.

SUMMARY OF THE INVENTION

It will be appreciated from the foregoing that it is a general object of the invention to provide carbon fibers having high quality, coupled with especially high strength.

A more specific object of the invention is to obtain flame-resistant filaments free of agglutination for providing carbon fibers of high strength.

A still more specific object of the invention is to provide a process for preparing acrylonitrile-based filaments free of agglutination in a spinning and a stabilization step for producing the carbon fibers.

The foregoing objectives of the invention are achieved by providing a process for preparing carbon fibers of high strength while preventing agglutination thereof during preparation, which compries forming a polymeric solution by homopolymerizing acrylonitrile or copolymerizing acrylonitrile with other vinyl monomers in a concentrated zinc chloride aqueous solution which contains impurity levels of basic salts, and for reducing amide groups in said fibers there being included in said solution hydrogen chloride in an amount by weight of from 0.01 to 5% in excess of an equivalent amount of the basic salts, to form a zinc chloride solution of a pH of at most 2 prior art to forming said polymeric solution, spinning said polymeric solution to form precursor filaments, and carbonizing said precursor filaments to provide the carbon fibers.

BRIEF DISCLOSURE OF THE ACCOMPANYING DRAWING

Figure 2:
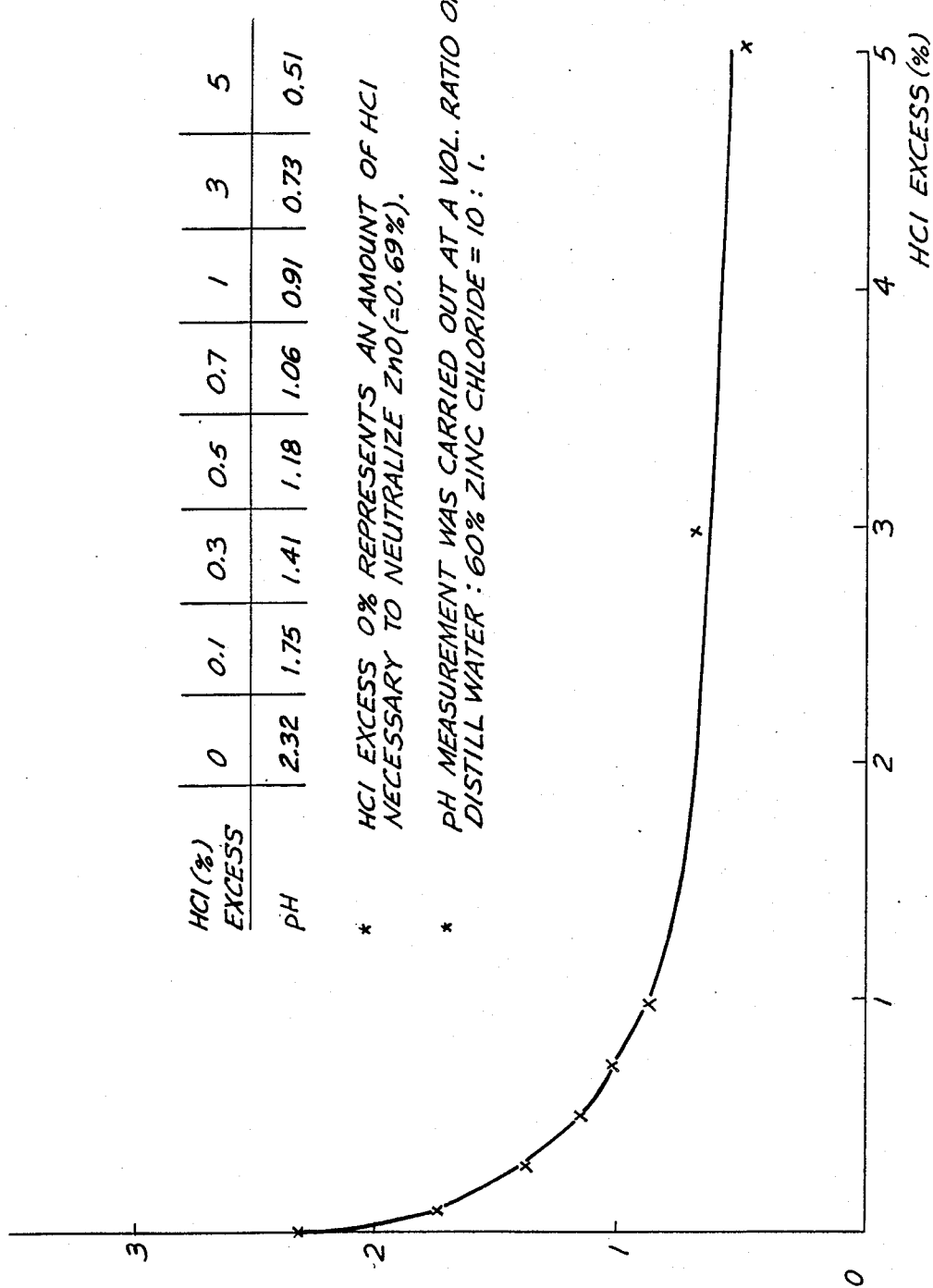

FIG. 1 is a plot of HCl concentration (on the abscissa) vs pH and the amount of amide radicals in the polymer (on the ordinate axis), where the amide radical is represented by the ratio of absorbance at 1685 cm$^{-1}$ showing an amount of C=O (of the amide radical) relative to that of C—H group at 2935 cm$^{-1}$ (the latter showing no variation upon hydrolysis in the infrared absorbsion spectrophotometry; and FIG. 2 is a plot of the same variables as plotted in FIG. 1 except that FIG. 2 involves an extended range of HCl concentration.

DETAILED DISCLOSURE OF THE INVENTION

In accordance with the invention, a monomer for polymerization may be acrylonitrile alone but more than 85%, preferably more than 90% of acrylonitrile is suitably used in combination with comonomers, or other vinyl compounds in order to improve spinnability. Examples of comonomers include methacylonitrile, acrylic acid, methacrylic acid, itaconic acid, crotonic acid, methyl acrylate, methyl methacrylate, p-styrene sulfonic acid, and p-styrene sulfonic acid esters.

The concentration of the zinc chloride aqueous solvent in the solution may be more than 50 wt. %, preferably more than 55 wt. %. A lower concentration may decrease the ability to dissolve the polymer, resulting in turbidity depending on the polymeric composition. On the other hand, a higher concentration may increase the viscosity of the solution, resulting in high susceptibility to solidification at a low temperature. For this reason, the upper limit of the concentration is preferably 70 wt. %.

Zinc chloride used in the solution is preferably of high purity. Commericaly available high grade zinc chloride generally contains as much as about 1% of basic salts as impurities. The basic salts content may be determined by a method according to JIS-K-1428. In accordance with the invention, more than a stoichiometric amount of hydrogen chloride equivalent to that of the basic salts should be added, the amount being such as to provide a solution with a pH of at most 2. The quantity of water contained in hydrochloric acid and/or formed by reaction of the basic salt with hydrochloric acid should be calculated in order to establish the defined concentration of the zinc chloride aqueous solution. Similarly,, the quantity of water formed by reaction with the basic salts must also be calculated when gaseous hydrogen chloride is used.

The concentration of hydrogen chloride in the zinc chloride aqueous solution should be such that the amount of HCl used is greater than that required for neutralizing the basic salts, that is, from about 0.01% by weight, below which agglutination may occur. On the other hand, the upper limit is preferably about 5% by weight, above which no material control of agglutination occurs and corrosion of the apparatus or injury to workers may occur.

Polymerization should be carried out in a medium of said aqueous concentrated ZnCl$_2$ solution containing the defined amount of hydrogen chloride, namely more than 0.01% to about 5% by weight with the pH of the solution being at most 2. Any initiator for polymerization may be used, which is soluble in the medium. In place of the initiator, the polymerization may be thermally initiated or photo-initiated. There may also be used materials for providing radicals by heat or ray, such as azo-compounds (for example, $\alpha,\alpha'$-azo-bis-butylonitrile), organic peroxides (for example, benzoyl peroxide and cumene hydro-peroxide), inorganic peroxides (for example, sodium persulfate) and dyestuffs (for example, acrylflavin. Further, so-called redox initiators of peroxides combined with reducing agents may in practice be useful. One should take into account that some initiators may increase the decomposition rate in the presence of hydrogen chloride, depending on the polymerizing conditions. A temperature for polymerization may be below 60° C., preferably below 45° C. Exposure of the monomer or polymer solution to a high temperature for a prolonged time may cause agglutination on heating rolls in the spinning step and/or in the stabilization step. In this regard, a batch type polymerization; in which necessary amounts of solvent, monomer(s) and initiator are charged into a polymerizer, the temperature is suddenly increased due to heat of polymerization at a time when the monomer content is high, and simultaneously the viscosity is also increased. For this reason, the batch type polymerization is not preferred because of the difficulty in controlling the reaction temperature. On the other hand, continuous type polymerization, where the monomer(s) and the initiator, if used, are continuously charged into the polymerizer while stirring, is preferred. In such continuous process, because the resulting polymer solution is continuously removed from the polymerizer, it is suitable for maintaining the monomer content in the polymerizer at a constant low level and for controlling the reaction temperature. In the continuous process, a helical agitator may be used for substantially complete mixing of the reactants in the vessel. The viscosity and the polymer content of the resulting polymer solution, as well as the molecular weight of the polymer may be controlled by the polymerization temperature, the initiator concentration and the monomer content. If desired, copper ion may be added to reduce the viscosity of the polymer solution and the molecular weight of the polymer.

The properties above described (the viscosity of the polymer solution, the polymer content and the molecular weight of the polymer) are interrelated. Preferably the viscosity is in the range of 100 to 10,000 poise at 45° C. while the molecular weight is in the range of 60,000 to 600,000 according to the Staudinger's viscosity equation. When the viscosity is kept constant, the polymer content of high molecular weight polymer is preferably decreased in order to obtain filaments of high strength. The resulting polymer solution is then subjected to spinning in a spinning step, if necessary, after removal of unreacted monomer(s), filtration and defoaming The polymeric solution introduced into the spinning step after polymerization is kept at a temperature not higher than 60° C., preferably not higher than 45° C., in order to prevent agglutination. During the spinning step the polymeric solution is generally heated to decrease an apparent viscosity but should be kept at not higher than 60° C., preferably not higher than 45° C. The polymeric solution is extruded through a nozzle having openings of 50–200 μm into a coagulating bath for forming filaments. The polymeric solution may be extruded directly into the coagulating bath but may also be extruded through a suitable air gap into the bath. For the coagulating bath, a zinc chloride aqueous solution of a low temperature and a low concentration is used. A minor amount of decomposed products of the polymerization initiator or other salt may be present in the bath. The concentration of zinc chloride is in the range of 10 to 40 wt. %. The temperature of the aqueous solution is preferably in the range of $-10°$ to $+20°$ C. The lower the temperature, the higher the concentration that may be utilized with resulting higher density filaments. Too low a temperature causes increased energy loss and difficulty in operation. Higher temperatures with the higher concentration of zinc chloride causes nonuniformity of the filaments, in sectional direction, and a rough structure.

The filaments leaving the coagulating bath are optionally cold-stretched in a diluted zinc chloride aqueous solution or in water, rinsed in water, dried and hot-stretched in the conventional manner but are preferably treated in hot water of 60°–100° C. prior to drying. The treatment with hot water is intended to prevent the filaments from being agglutinated to adjacent filaments upon contact with rollers of high temperature in the drying and hot-stretching steps. Use of too high a temperature may generate voids in the filaments and should be avoided. The filaments may be stretched, if desired, during the hot water treatment. Between the hot water treatment and the drying step the filaments are preferably imparted with an oily agent for preventing static build-up and agglutination. For preventing static build-up, the oily agent is selected from phosphate esters, higher alcohols and polyalkylene oxides is preferred while a silicone type agent is preferred for preventing the agglutination. If desired, the oily agent may be additionally imparted to the filaments after the hot-stretching step after which the filaments may be subjected to a so-called reluxing (or heating) treatment under low or no tension to increase stretchability of the filaments and improve operability. The acrylonitrile filaments thus produced are then subjected to the stabilization and carbonization steps to form the carbon fibers.

The stabilization step is preferably carried out, for its initial stage, at a temperature of 180° to 250° C. for not less than 5 minutes. Initial exposure to a higher temperature may cause undesired aggultination and therefore should be avoided.

The invention will be described hereinbelow for better understanding with reference to non-limiting examples.

EXAMPLE 1

As an apparatus for polymerization, two polymerizers each equipped with a jacket for hot water and an agitator having a helical vane were connected in series, and thereto were attached five pumps for feeding a monomer solution and two types of polymerization initiator solutions to one of the polymerizers and for feeding two types of polymerization initiator solutions to the other polymerizer. The monomer solution and the initiator solutions were introduced continuously while the corresponding amount of the resulting polymeric solution was withdrawn therefrom. As for a solvent for the acrylonitrile polymers there was used a 60% aqueous solution of commercially available zinc chloride (containing 0.69% of basic salts). As the monomer, there was used a mixture of 95% acrylonitrile, 4% methylacrylate and 1% itaconic acid. As the polymerization initiators there were used sodium persulfate and sodium bisulfite in combination. Into the other (second) polymerizer were introduced the polymer solution withdrawn from the first polymerizer and each initiator in a half amount of the first polymerizer for completing the polymerization. The concentration of the monomer, the amounts of the initiators and an amount of cuprous chloride were adjusted so as to form a polymeric solution having a concentration of 7% and a viscosity at 40° C. of 400 poises. In this example, concentrated hydrogen chloride was used in an amount of the basic salts 0.69 wt.% as ZnO contained in the zinc chloride solvent. In other words, as a weight ratio of HCl to 60% $ZnCl_2$, 0.62% of added HCl was consumed for neutralizing the basic salts while 0.1% excess was contributed to a pH value. Polymerization was carried out at 40° C. to form the polymeric solution, which was then subjected to a defoaming procedure and to filtration. Thereafter, the solution was extruded through a nozzle having 3000 holes each of 100 μm diameter into a coagulating bath of 25% zinc chloride aqueous solution at 5° C. to form filaments, which in turn were rinsed in a water bath to remove the zinc chloride aqueous solution and passed through a hot water bath of 80° C. Then, the filaments were imparted with an oily agent of dimethylpolysiloxane type and passed through a hot air of 120° C. and a hot roll of 150° C. for drying. Thereafter, the filaments were hot-stretched in saturated stream of 2 $Kg/mm^2$ and again imparted with the same type oily agent and received, on falling, in a receptacle. A total draft (a falling rate/a passing rate through holes) was 30. The filaments in the receptacle were treated under relative conditions of 95% at about 100° C. and then passed through a stabilizing furnace having a temperature gradient from an inlet of 230° C. to an outlet of 280° C. in hot air over a period of 30 minutes under tension of about 500 g. Before and during the stabilization step, no agglutination was observed in the filaments. The stabilized filaments were then carbonized in a furnace of 1300° C. in a nitrogen atmosphere. The resulting carbon fibers had very high strength of 538 $Kg/mm^2$, as determined by a resin impregnating strand test according to JIS-R-7601.

EXAMPLES 2 TO 5

The procedures for these Examples were similar to those in Example 1. Examples 2 to 5 are intended to demonstrate the effect of addition of different weight percentages of HCl to, and the resulting pH of, a 60% aqueous solution of commercially available zinc chloride containing 0.69% of basic salts. The weight percentages of HCl added were, below, equal to and in excess over an equivalent amount of the basic salts. Table 1 below indicates the effect that different weight percentages of HCl has on the strength and agglutination of the carbon fibers and on amide radicals in a polymeric solution having a concentration of 7% and a viscosity at 40° C. of 400 poise.

The relation between a HCl excess amount and a HCl concentration will be explained for better understanding the concept of the invention. In accordance with the Japanese Industrial Standard (JIS), an amount of basic salts in zinc chloride is determined by titration with hydrochloric acid and calculated as ZnO (zinc oxide), which procedure is also applied to this invention. It has been considered that the neutralization of ZnO with HCl is completed by use of 2 mols of HCl (72.92 g) relative to 1 mol of ZnO (81.37 g). An excess HCl amount over the equivalent point is described as a HCl concentration in the description. Thus, −0.62% of HCl concentration in FIG. 1 (abscissa) corresponds to 0.69% of basic salts as ZnO.

For plotting FIGS. 1 and 2 a number of samples were prepared utilizing as a solvent for polyacrylonitrile a 60% aqueous solution of zinc chloride containing 0.69% basic salts and varying amounts amounts of HCl. FIG. 1 shows in the upper solid line curve the relationship between concentrations of hydrochloride acid added before polymerization (abscissa) and the amount of amide radicals in the polymer (ordinate) wherein the ordinate represents, in lieu of the amide radical per se, a ratio of absorbance at 1685 $cm^{-1}$ showing an amount of C=O group (of the amide radical) relative to that of C—H group at 2935 $cm^{-1}$ (the latter showing no variation upon hydrolysis) in the infrared absorption spectrophotometry. FIG. 1 in the lower curve, with partially dotted line, also shows the relationship between the concentration of HCl added and pH and shows in FIG. 2 the pH profile extended to HCl concentration of 5%.

FIGS. 1 and 2 indicate that at pH 3, for example, the HCl concentration is equal to about minute 0.1 weight percent HCl concentration and is below the zero point on the abscissa which represents the amount of HCl necessary to neutralize the basic salts in the zinc chloride aqueous solution. As will be seen from FIGS. 1 and 2, and Table 1 below, the beneficial results are only attained when the HCl concentration is greater than 0, in particular in the range of 0.01 to 5% by weight corresponding respectively to a pH of about 2 and about 0.51. In the stated concentration range of HCl, the amide group in the fibers is sufficiently low to prevent agglutination during subsequent stabilization of the filaments and the carbon fiber strength is above 500 $kg/mm^2$.

FIGS. 1 and 2 show that with a pH adjustment of 3, for example, the HCl concentration is about minus 0.1 wt. % and thus falls below the zero concentration point. Below the zero concentration point more amide groups are seen to be present at, for example, a pH of 3 than exist with an HCl concentration between about 0.01 and 5 wt. % (corresponding to a PH of about 2 and about 0.51). Table 1 establishes that where there is no hydrogen chloride in the zinc chloride aqueous solution or where the hydrogen chloride concentration is equivalent to the basic salts (0 in FIG. 1) some agglutination of stabilized filaments will occur, none occurring when the HCl concentration is between about 0.01 and 5% which, as seen in Examples 1, 2, and 3 of Table 1, provide carbon fiber strength of 538, 538 and 552 $kg/mm^2$, respectively, as against fiber strengths of 205, 332 and 356 $kg/mm^2$ in Table 1 for comparative examples 1, 2 and 3 respectively.

The tabulated results in Table 1 for Example 2, as confirmed by FIG. 1, show that for addition of HCl at concentration of 0.1%, the pH of the zinc chloride aqueous solution is 1.8. It will be appreciated that the pH of the aqueous solution in Example 1 is also 1.8 since the procedures followed in Example 2 were similar to those used in Example 1

The procedures for Example 3 were similar to those in Example 1, except for differences as indicated in Table 1 below. The results obtained are also tabulated in Table 1 which shows that for 0.3% HCl concentration the pH of the zinc chloride aqueous solution containing such concentration of HCl is 1.4.

The procedures for Example 4 were similar to those in Example 1, except for differences as indicated in Table 1 below. The results obtained are also tabulated in Table 1 which shows that for 0.01% HCl concentration the pH of the zinc chloride aqueous solution containing such concentration of HCl is about 2.

The procedures for Example 5 were similar to those in Example 1, except for the differences indicated in Table 1 below. The results obtained are also tabulated in Table 1 which shows that for 0.5% HCl concentration the pH of the zinc chloride aqueous solution containing such HCl concentration is about 0.5.

COMPARATIVE EXAMPLE 1

The procedures were similar to those in Example 1, except for the absence of hydrogen chloride and other differeces as indicated in Table 1. The results are also shown in Table 1.

COMPARATIVE EXAMPLE 2

The procedures were similar to those in Example 1 except that hydrogen chloride was used in an equivalent amount to the basic salts in zinc chloride. Other differences and the results obtained including pH data, are shown in Table 1.

COMPARATIVE EXAMPLE 3

The procedures were similar to those in Example 2, except for the temperature of the hot water bath, as indicated in Table 1. The results, including pH data, are also shown in Table 1.

COMPARATIVE EXAMPLE 4

The procedures were similar to those in Example 3, except for the temperature of the hot water bath, as indicated in Table 1. The result, including pH data, are also shown in Table 1.

than 500 kg/mm$^2$. As seen in Table 1 hydrogen chloride should be included from about 0.01 to 5% by weight.

EXAMPLE 6

Polymerization was carried out similarly to Example 3, except that 100% acrylonitrile was used as the monomer in a concentration of 6 wt.%. The total draft in the spinning step was 15. A higher draft could form a larger amount of filament chips but not cause any agglutination. The passing time through the stabilizing furnace was increased to 45 minutes but again did not cause agglutination of the stabilized filaments. The resulting carbon fibers had a strength of 486 Kg/mm$^2$.

By following the teachings of the invention, agglutination of the filaments can be prevented during the spinning and stabilization steps, thereby ensuring smooth and uniform carbon fibers the filaments of which are readily separated for a sizing procedure. Strenghts of more than 400 Kg/mm$^2$ to 500 Kg/mm$^2$ may be readily achieved by practicing our process. Further, heating to a temperature higher than 2000° C. in a inert atmosphere may form graphite fibers of high quality.

Although the invention has been described hereinabove with the preferred embodiments, it will be appreciated to a person skilled in the art that many variations and modifications may be possible without departing from the spirit and scope of the invention.

What we claim is:

1. A process for preparing carbon fibers of high strength while preventing agglutination thereof during preparation, which comprises forming a polymeric solution by homopolymerizing acrylonitrile or copolymerizing at least 85 percent by weight of acrylonitrile with other vinyl monomers in a concentrated zinc chloride aqueous solution which contains impurity levels of basic salts, and for reducing amide groups in said fibers and increasing the strength of carbon fibers formed there being included in said zinc chloride aqueous solution hydrogen chloride in an amount by weight of from 0.01 to 5% in excess of an equivalent amount of the basic salts to form a zinc chloride solution of a pH of at most 2 prior to forming said polymeric solution, spinning said polymeric solution to form precursor filaments, and carbonizing said precursor filaments to provide carbon fibers.

2. A process according to claim 1, wherein the steps of polymerization through spinning are effected at a temperature of at most 60° C.

TABLE 1

|  | HCL Concentration | pH | Temp. for Polymerition (°C.) | Temp. of Nozzle (°C.) | Temp. of Hot Water Bath (°C.) | Agglutination of Filaments | Agglutination of Stabilized Filaments | Strength of Carbon Fibers (Kg/mm$^2$) |
|---|---|---|---|---|---|---|---|---|
| Com. Ex. 1 | No | >5 | 70 | 100 | 20 | Yes | Yes | 205 |
| Com. Ex. 2 | equiv. to basic salts | 2.3 | 50 | 40 | 20 | slight | Yes | 332 |
| Com. Ex. 3 | equiv. to basic salts | 2.3 | 50 | 40 | 80 | No | slight | 356 |
| Com. Ex. 4 | minus 0.1% | 3 | 40 | 40 | 80 | Yes | Yes | 285 |
| Ex. 1 | 0.1% | (1.8) | 40 | 40 | 80 | No | No | 538 |
| Ex. 2 | 0.1% | about 1.8 | 40 | 40 | 80 | No | No | 538 |
| Ex. 3 | 0.3% | about 1.4 | 40 | 40 | 95 | No | No | 552 |
| Ex. 4 | 0.01% | about 2 | 40 | 40 | 80 | No | No | 490 |
| Ex. 5 | 5% | about 0.51 | 40 | 40 | 80 | No | No | 512 |

It will be appreciated from the results in Table 1 that agglutination during the spinning and stabilization steps can positively be avoided by inclusion of hydrogen chloride in an amount more than the equivalent amount of the basic salts contained as impurities in the zinc chloride aqueous solution and that hydrogen chloride imparts very high strength to the carbon fibers of more 3. A process for preparing carbon fibers of high strength while preventing agglutination thereof during preparation, comprising forming a polymeric solution by homopolymerizing acrylonitrile or copolymerizing at least 85 percent by weight of acrylonitrile with other vinyl monomers in a solvent of a concentrated zinc chloride aqueous solution to which is added, for decreasing amide groups in the fibers, hydrogen chloride in a concentration, excluding an amount for neutralizing basic salts, if any, in said zinc chloride solution, between 0.01 to 5% by weight, spinning said polymeric solution to form precursor filaments, and carbonizing said precursor filaments to provide carbon fibers.

4. The process of claim 3, wherein prior to the carbonizing step, the filaments are stabilized at a temperature of from 180° to 250° C. for not less than 5 minutes.

5. The process of claim 1, wherein the amount of hydrogen chloride in relation to basic salts is such as to prevent conversion of nitrile groups to amide groups.

6. A process according to claim 1, wherein the filaments are obtained by spinning the polymeric solution in a coagulating bath of a diluted zinc chloride aqueous solution and are treated, prior to said carbonizing step, with hot water at 60°–100° C. after rinsing in water.

7. A process for preparing carbon fibers of high strength by preventing agglutination thereof during preparation, which comprises forming a polymeric solution by homopolymerizing acrylonitrile or copolymerizing at least 85 percent by weight of acrylonitrile with other vinyl monomers in a concentrated zinc chloride aqueous solution which contains impurity levels of basic salts, and for reducing amide groups in said fibers and increasing the strength of carbon fibers formed there being included in said zinc chloride aqueous solution hydrogen chloride in an amount by weight of from 0.01 to 5% in excess of an equivalent amount of the basic salts to form a zinc chloride solution of a pH of at most 2 prior to forming said polymeric solution, spinning said polymeric solution to form precursor filaments, and carbonizing said precursor filaments to provide carbon fibers, said spinning being effected at a temperature of at most 60° C.

8. A process according to claim 7, wherein said spinning of the polymeric solution is performed in a coagulating bath of a diluted zinc chloride aqueous solution and filaments obtained by the spinning are treated, prior to said carbonizing step, with hot water at 60°–100° C. after rinsing in water.

* * * * *